(12) United States Patent
Chen et al.

(10) Patent No.: US 7,471,216 B2
(45) Date of Patent: Dec. 30, 2008

(54) HANDHELD CONTROLLER FOR VEHICLES

(75) Inventors: Michael Chen, Naugatuck, CT (US); Steven Cai, Orange, CT (US); David Sulkowski, Guilford, CT (US)

(73) Assignee: Ultra Electronics Measurement Systems, Inc., Fairfield, CT (US)

( * ) Notice: Subject to any disclaimer, the term of this patent is extended or adjusted under 35 U.S.C. 154(b) by 91 days.

(21) Appl. No.: 11/274,621

(22) Filed: Nov. 15, 2005

(65) Prior Publication Data

US 2006/0116204 A1 Jun. 1, 2006

Related U.S. Application Data

(60) Provisional application No. 60/628,629, filed on Nov. 17, 2004.

(51) Int. Cl.
*H03M 11/00* (2006.01)

(52) U.S. Cl. .............................. 341/20; 701/2; 244/190; 341/176; 463/37; 463/36; 463/39

(58) Field of Classification Search .................. 341/20, 341/22, 176; 701/2; 244/190; 463/36, 37, 463/39

See application file for complete search history.

(56) References Cited

U.S. PATENT DOCUMENTS

| 4,964,598 | A | * | 10/1990 | Berejik et al. | 244/190 |
|---|---|---|---|---|---|
| 5,764,180 | A | * | 6/1998 | Cummings | 341/176 |
| 5,785,281 | A | * | 7/1998 | Peter et al. | 244/190 |
| 5,871,406 | A | * | 2/1999 | Worrell | 473/221 |
| 5,874,906 | A | * | 2/1999 | Willner et al. | 341/22 |
| 6,057,788 | A | * | 5/2000 | Cummings | 341/22 |
| 6,218,616 | B1 | * | 4/2001 | Bates et al. | 174/66 |
| 6,261,180 | B1 | * | 7/2001 | Lebensfeld et al. | 463/49 |
| 6,694,228 | B2 | * | 2/2004 | Rios | 701/2 |
| 6,885,314 | B2 | * | 4/2005 | Levin et al. | 341/20 |
| 7,265,306 | B2 | * | 9/2007 | Radu | 200/310 |

* cited by examiner

*Primary Examiner*—Albert K Wong
(74) *Attorney, Agent, or Firm*—Jay H. Anderson; Dale L. Carlson; Wiggin and Dana LLP

(57) ABSTRACT

A handheld controller allows a human operator to control various aspects of a vehicle's operation. The operator's fingers are used to manipulate various devices (e.g., buttons, switches, joysticks, levers, triggers, trackballs and the like) disposed on the handheld controller to control aspects of the vehicle's operation associated with these devices. The handheld controller may provide control signals to the vehicle by a cable, or by a wireless connection. The handheld controller allows the operator to freely move about the vehicle's compartment or to move outside the compartment, while still being able to control the various aspects of vehicle operation. Furthermore, the handheld controller allows the operator to control the various aspects of vehicle operation from a location away from potentially hazardous surfaces within the compartment, which helps to prevent the operator from contacting these surfaces in the event that the vehicle is struck by an object (e.g., enemy artillery, another vehicle, etc.) or otherwise jarred.

30 Claims, 10 Drawing Sheets

HANDHELD CONTROLLER FOR VEHICLES

CROSS-REFERENCE TO RELATED APPLICATIONS

This application claims the benefit of U.S. Provisional Patent Application No. 60/628,629 filed Nov. 17, 2004, which is incorporate by reference herein in its entirety.

BACKGROUND

The present invention is directed to a controller for a vehicle and, more particularly, to a handheld controller for controlling a vehicle.

Modern vehicles, such as for example, automobiles, planes, armored vehicles, helicopters, boats, submarines, and the like, require the vehicle's operator to control many different aspects of the vehicle's operation. This is particularly true of military and law enforcement vehicles, which often require an operator to control equipment related to weaponry, countermeasures, communications, surveillance, and movement (e.g., direction, speed, altitude, depth, etc.) of the vehicle.

In such vehicles, control is typically accomplished through stationary control devices (e.g., buttons, dials, levers, wheels, and the like) that are rigidly fastened to the vehicle console, dashboard, or other control panel. While this served well in past, the increasing number of features found in modern vehicles leads to an increasingly complex control panel, while at the same time requiring the operator to perform control tasks at a faster rate.

Moreover, another drawback of the modern vehicle control technology is that in order to operate fixed controls, the operator must be positioned near the control panel. For example, U.S. soldiers fighting in the Iraq war reported that in order to operate existing fixed controls, the vehicle operators would have to remove their restraining straps and seat belts to have sufficient freedom within the vehicle's cockpit to operate the fixed controls. Tragically, when such vehicles were struck by enemy artillery, these operators were thrown about the vehicle's cockpit and seriously injured.

Thus, there is a need for a controller for controlling that allows the operator to quickly control a number of aspects of the vehicle's operation, while at the same time giving the operator the freedom to control the vehicle from a safe position.

BRIEF SUMMARY

In one aspect of the invention, there is provided a handheld controller for use by a human operator in controlling a plurality of aspects of a vehicle's operation. The handheld controller comprises a box portion, handle portions extending from the box portion, a first plurality of devices disposed on a top surface of the box portion, and a second plurality of devices disposed on a bottom surface of the box portion. The human operator grasps the handle portions, the first plurality of devices are manipulated by the human operator's thumbs, the second plurality of devices are manipulated by the human operator's fore fingers, and the handheld controller provides a control signal to the vehicle in response to manipulation of any of the first and second plurality of devices. In various embodiments, the control signal may be provided via a cable or by a wireless signal. The handheld controller and the human operator may be remote from the vehicle or located in the vehicle.

In another aspect, there is provided a handheld controller for use by a human operator in controlling a plurality of aspects of a vehicle's operation. The handheld controller comprises a box portion, handle portions extending from the box portion, a first plurality of devices disposed on a top surface of the box portion, and a second plurality of devices disposed on a bottom surface of the box portion. The human operator grasps the handle portions, the first plurality of devices are manipulated by the human operator's thumbs, the second plurality of devices are manipulated by the human operator's fore fingers. The handheld controller provides a control signal in response to manipulation of the first and second plurality of devices to control movement of the vehicle and at least one of operation of the vehicle's weaponry, operation of the vehicle's defensive countermeasures, operation of the vehicle's communications devices, operation of the vehicle's sensors, and operation of the vehicle's surveillance devices.

BRIEF DESCRIPTION OF THE DRAWINGS

Referring now the Drawing wherein like items are numbered alike in the various Figures.

DETAILED DESCRIPTION

Figure 1:
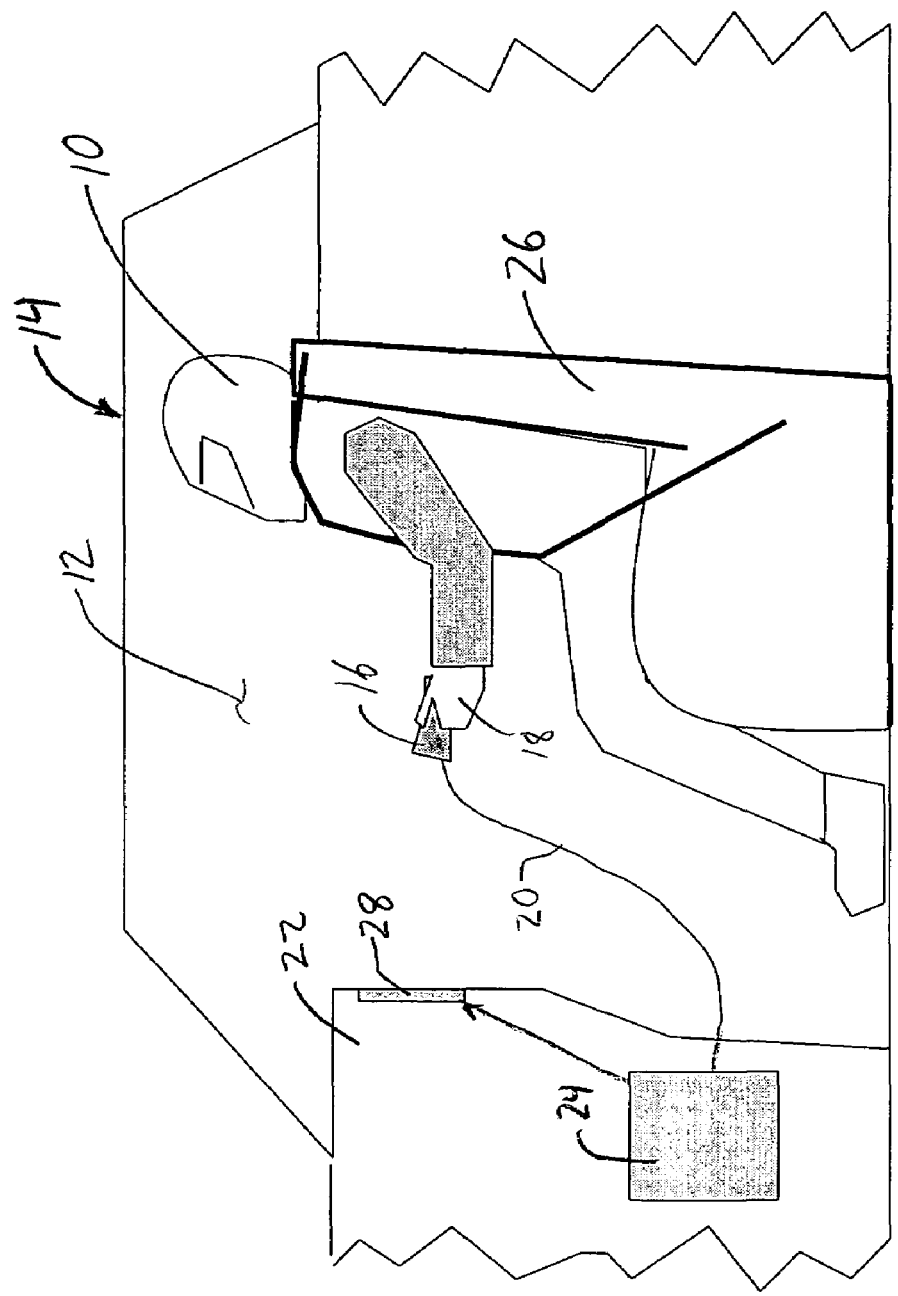
FIG. 1 is a schematic diagram of a vehicle operator operating a vehicle using a handheld controller of the present invention.

FIG. 1 depicts a human operator 10 seated within a compartment 12 of a vehicle 14 and controlling various aspects of the vehicle's operation using a handheld controller 16, which is grasped in the hands 18 of the operator 10. As will be described in further detail hereinafter, the operator's fingers are used to manipulate various devices (e.g., buttons, switches, levers, triggers, and the like) to control aspects of the vehicle's operation associated with these devices. In the embodiment shown, the controller 16 is tethered by a cable 20 to a console 22. The cable 20 transmits control signals from the handheld controller 16 to a signal processor 24, which adjusts the various aspects of the vehicle's operation in response to the control signals received from the handheld controller 16. Advantageously, the handheld controller 16 allows the operator 10 to control the various aspects of vehicle operation while fully secured into his or her seat 26. In addition, the cable 20 may be of sufficient length to allow the operator 10 to move freely about the compartment 12 or to move outside the compartment 12, while still being able to control the various aspects of vehicle 14 operation. Furthermore, the handheld controller 16 allows the operator 10 to control the various aspects of vehicle 14 operation from a location away from the console 22 or other potentially hazardous surfaces within the compartment 12, which helps to prevent the operator 10 from contacting these surfaces in the event that the vehicle 14 is struck by an object (e.g., enemy artillery, another vehicle, etc.) or otherwise jarred.

The vehicle 14 may be any vehicle such as, for example, an automobile, plane, armored vehicle, helicopter, boat, submarine, and the like. The handheld controller 16 is particularly well suited for use with military and law enforcement vehicles, which tend to require the operator 10 to control many different aspects of the vehicle's operation. For example, the vehicle 14 may be a Stryker armored vehicle or Cobra Gunship helicopter as used by U.S. military forces.

The cable 20 may be any cable suitable for the transmission of signals from the handheld controller 16 to the signal processor 24. The cable 20 and handheld controller 16 may employ any suitable protocol such as, for example, RS232 (also known as TIA232 and EIA232), RS422 (also known as EIA422), or USB (Universal Serial Bus). For example, the cable 20 may include electrical wiring connected to the console 22 by USB, serial, or other known connectors. Alternatively, the handheld controller 16 may provide an optical signal to the signal processor 24 via the cable 20 using any convenient protocol. The handheld controller 16 may alternatively provide a wireless signal (e.g. infrared, radio frequency, light, and the like) to the signal processor 24 using any known wireless protocol. In the latter embodiment, the cable 20 need not be used.

The signal processor 24 may be any device capable of receiving the control signals from the handheld controller 20 and adjusting the various aspects of the vehicle's operation in response to the control signals. The signal processor 24 may provide output to one or more monitors 28, gages, displays, and the like, which is viewed by the operator 10 to aid in controlling the various aspects of the vehicle 14. For example, the signal processor 24 may be one or more computers, microprocessors, application specific integrated circuits, and the like. The signal processor 24 may be part of a fly-by-wire or steer-by-wire system as found in modern vehicles. The signal processor 24 may also be part of an electronic fire control (weaponry) system, surveillance system, sensor system, defensive countermeasures system, communications system, and the like, as found in modern military and law enforcement vehicles.

The various aspects of the vehicle's operation controlled by the handheld controller 16 may include, for example, the movement (e.g., direction, speed, altitude, depth, etc.) of the vehicle 14. The various aspects of the vehicle's operation controlled by the handheld controller 16 may also include, for example, the adjustment and firing of weaponry; the deployment and adjustment of defensive countermeasures; the initiation and adjustment of communications devices; the deployment and adjustment of sensors (e.g., temperature, pressure, light, and other sensors); and the deployment and adjustment of surveillance devices (e.g., camera activation and positioning, listening device activation and positioning, sonar activation and control, radar activation and control, and the like).

Figure 2:
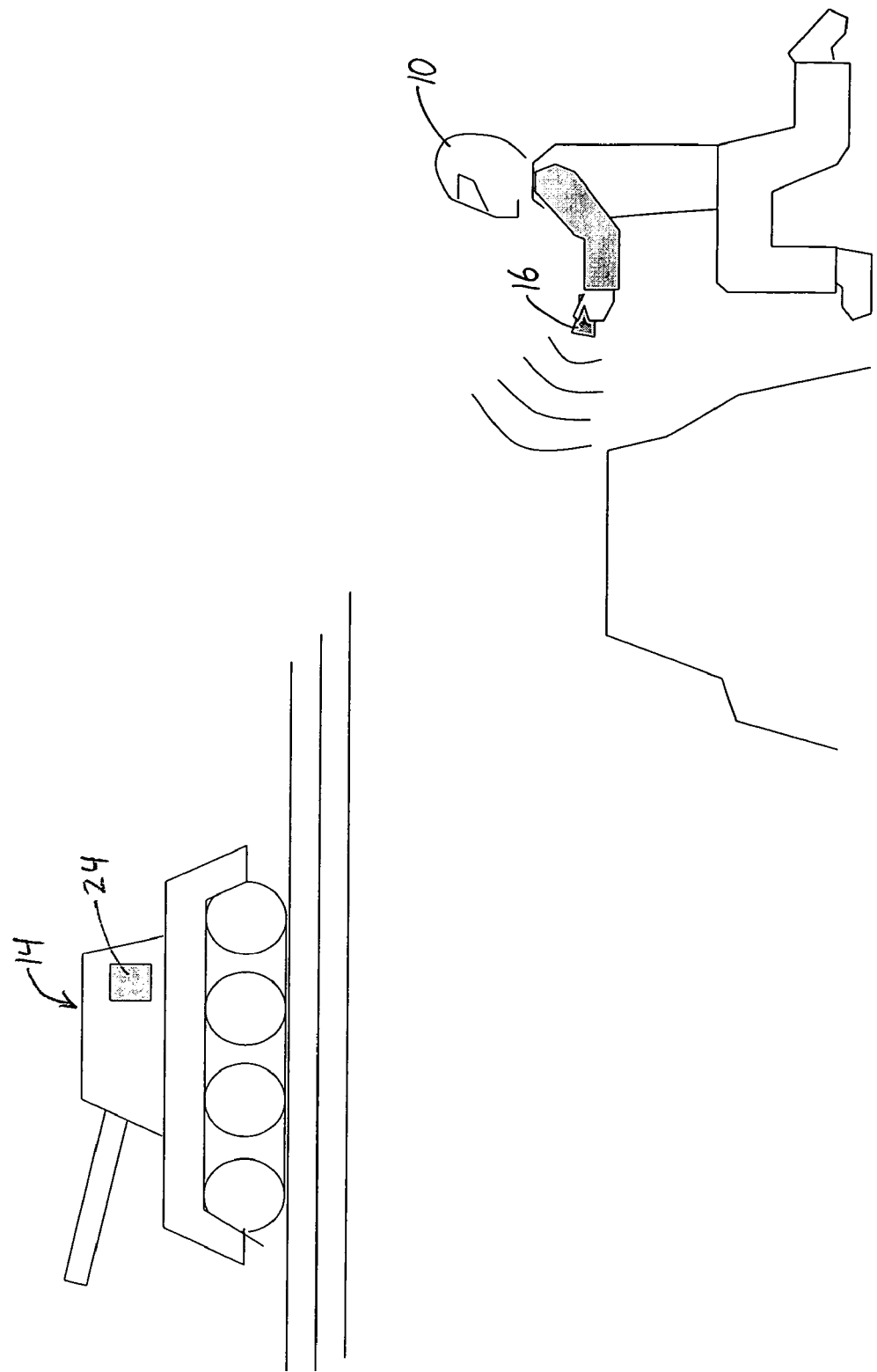
FIG. 2 is a schematic diagram of a vehicle operator remotely operating a vehicle using the handheld controller of the present invention.

Referring to FIG. 2, an embodiment of the invention is shown wherein the handheld controller 16 is used to remotely control the vehicle 14. In this embodiment, the controller 16 provides a wireless control signal to the signal processor 24 onboard the vehicle 14, thus allowing the operator 10 to control the various aspects of the vehicle's operation from a point of safety.

Figure 3:
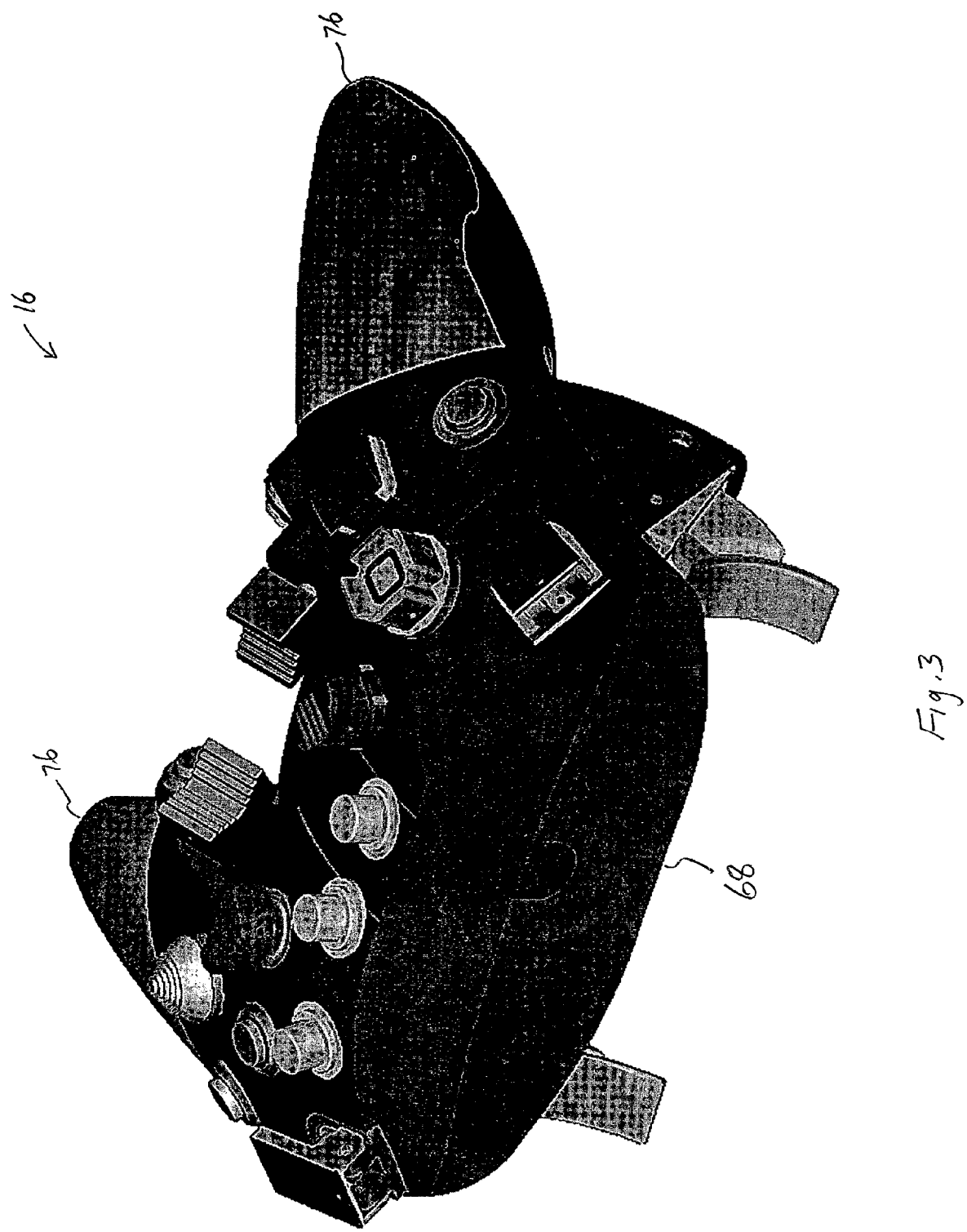
FIG. 3 is a front perspective view of the handheld controller of the present invention.
Figure 4:
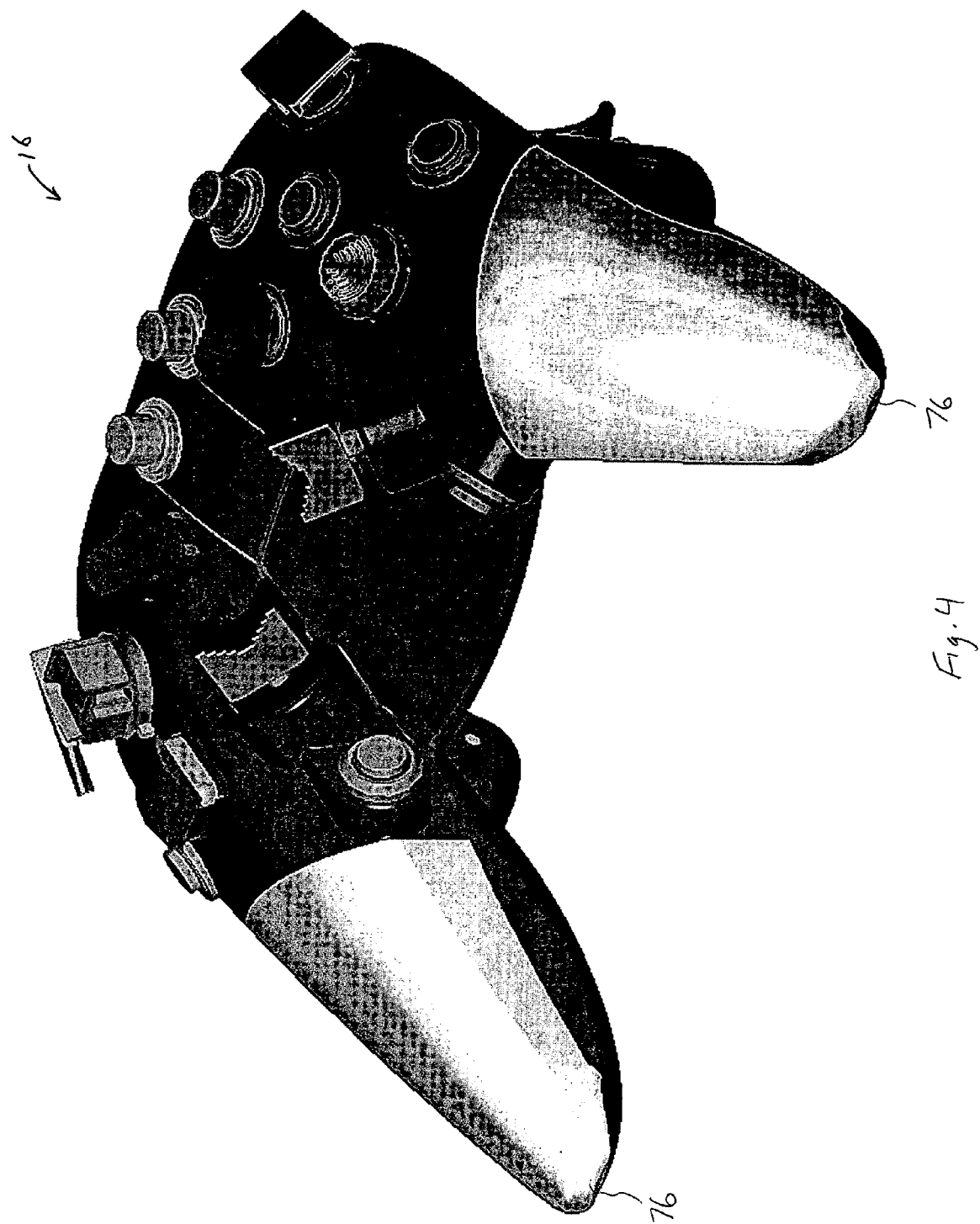
FIG. 4 is a rear perspective view of the handheld controller.
Figure 5:
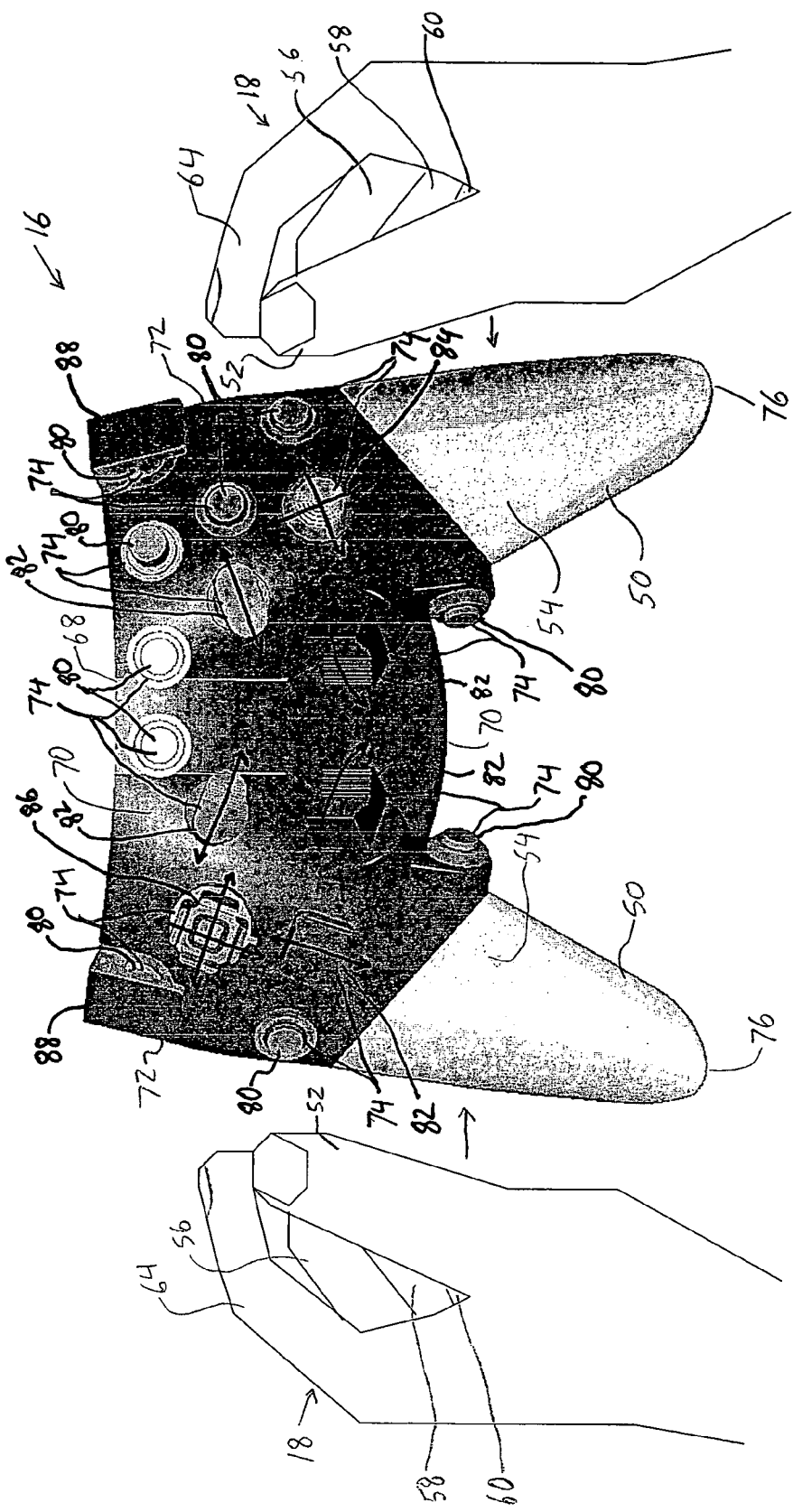
FIG. 5 is a top plan view of the handheld controller.
Figure 6:
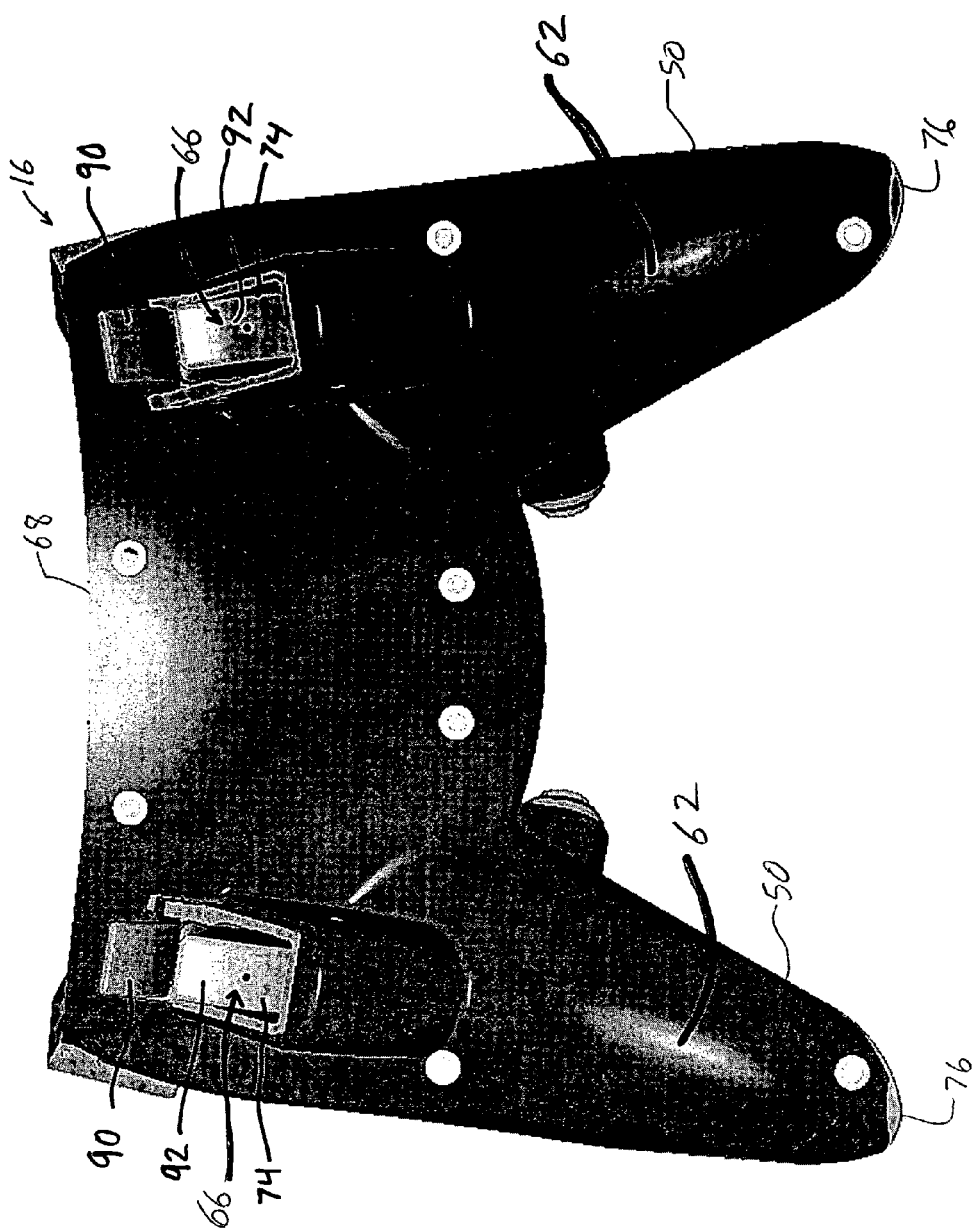
FIG. 6 is a bottom plan view of the handheld controller.
Figure 7:
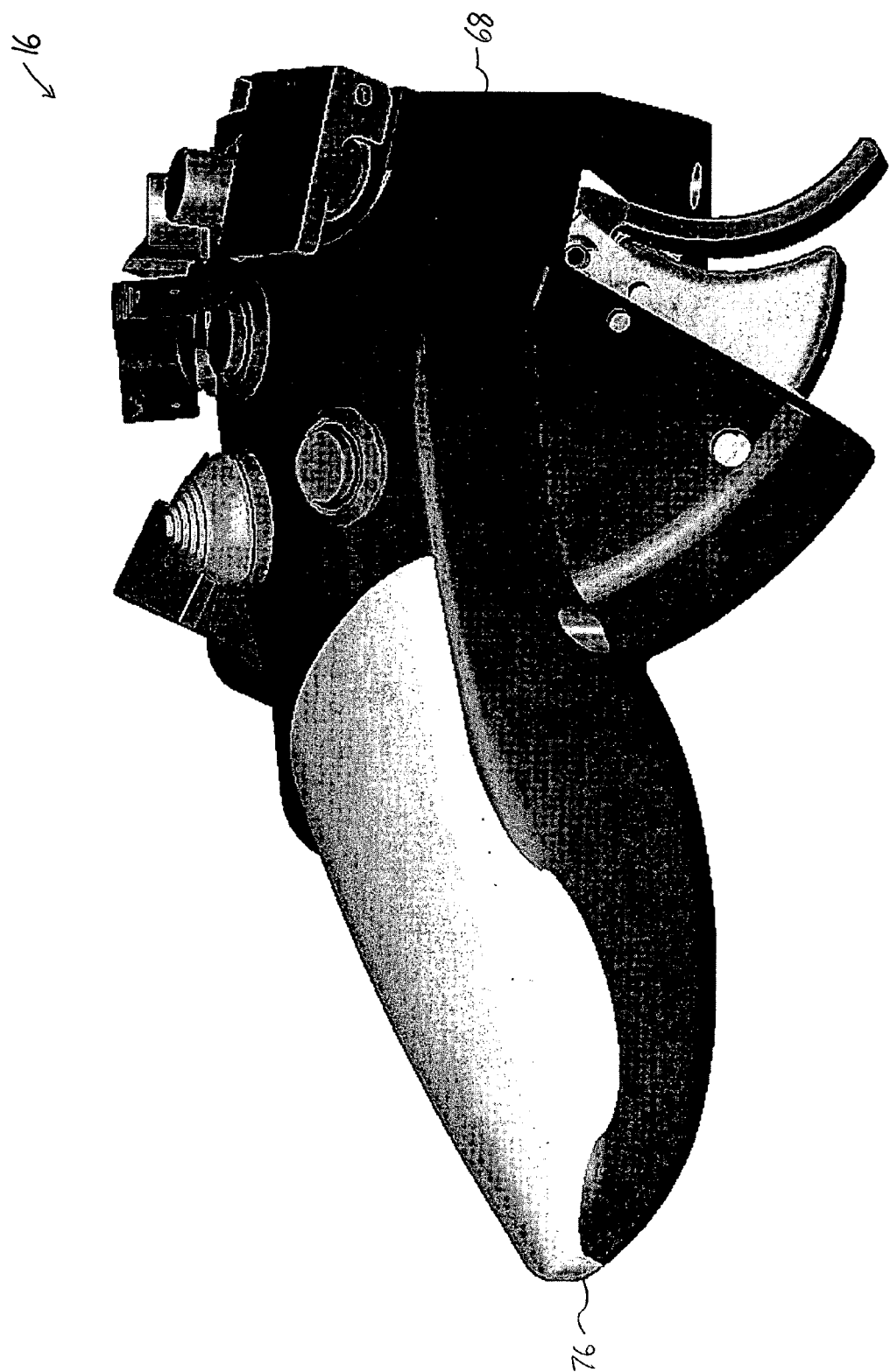
FIG. 7 is a right side elevation view of the handheld controller.
Figure 8:
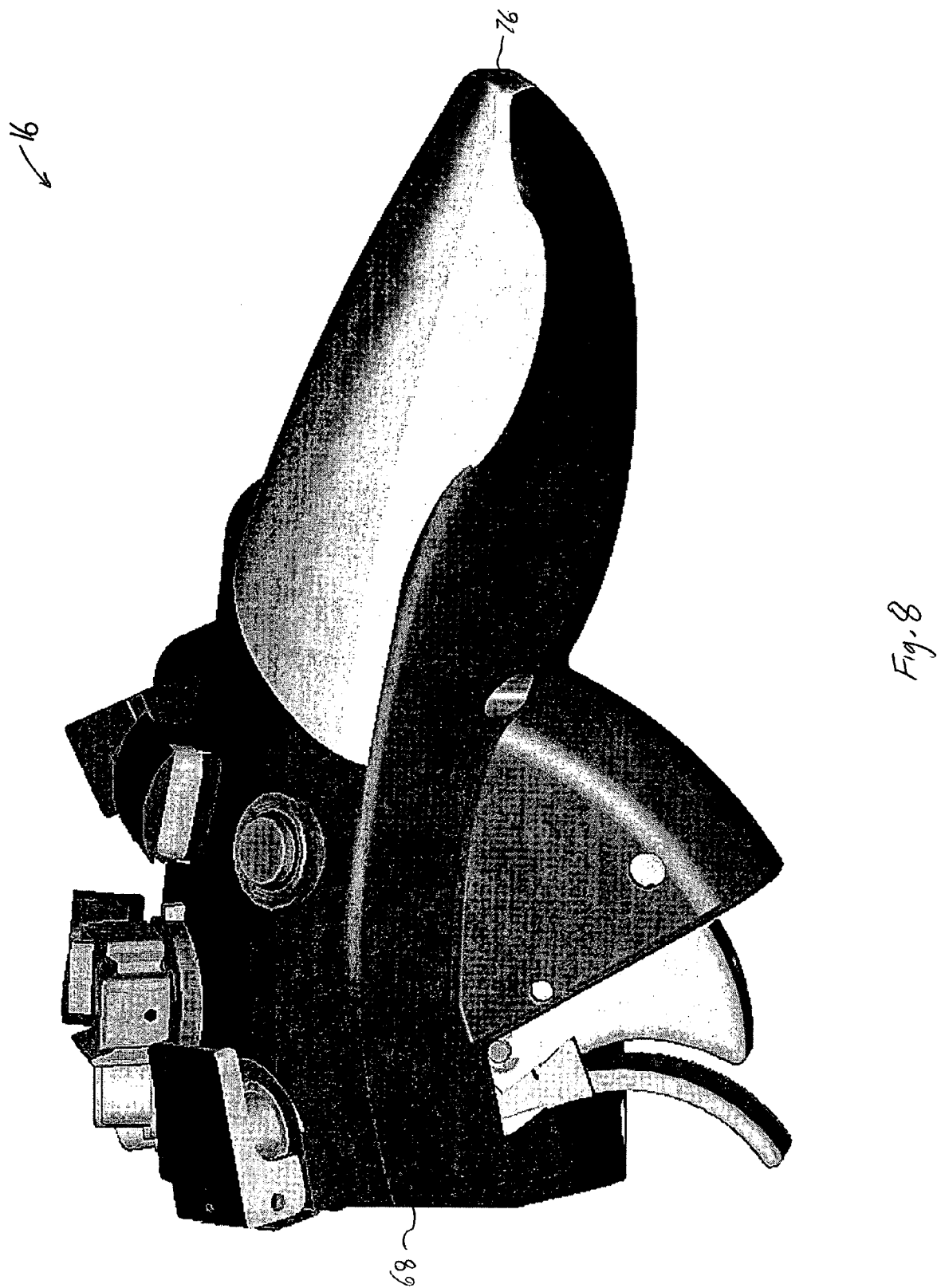
FIG. 8 is a left side elevation view of the handheld controller.
Figure 9:
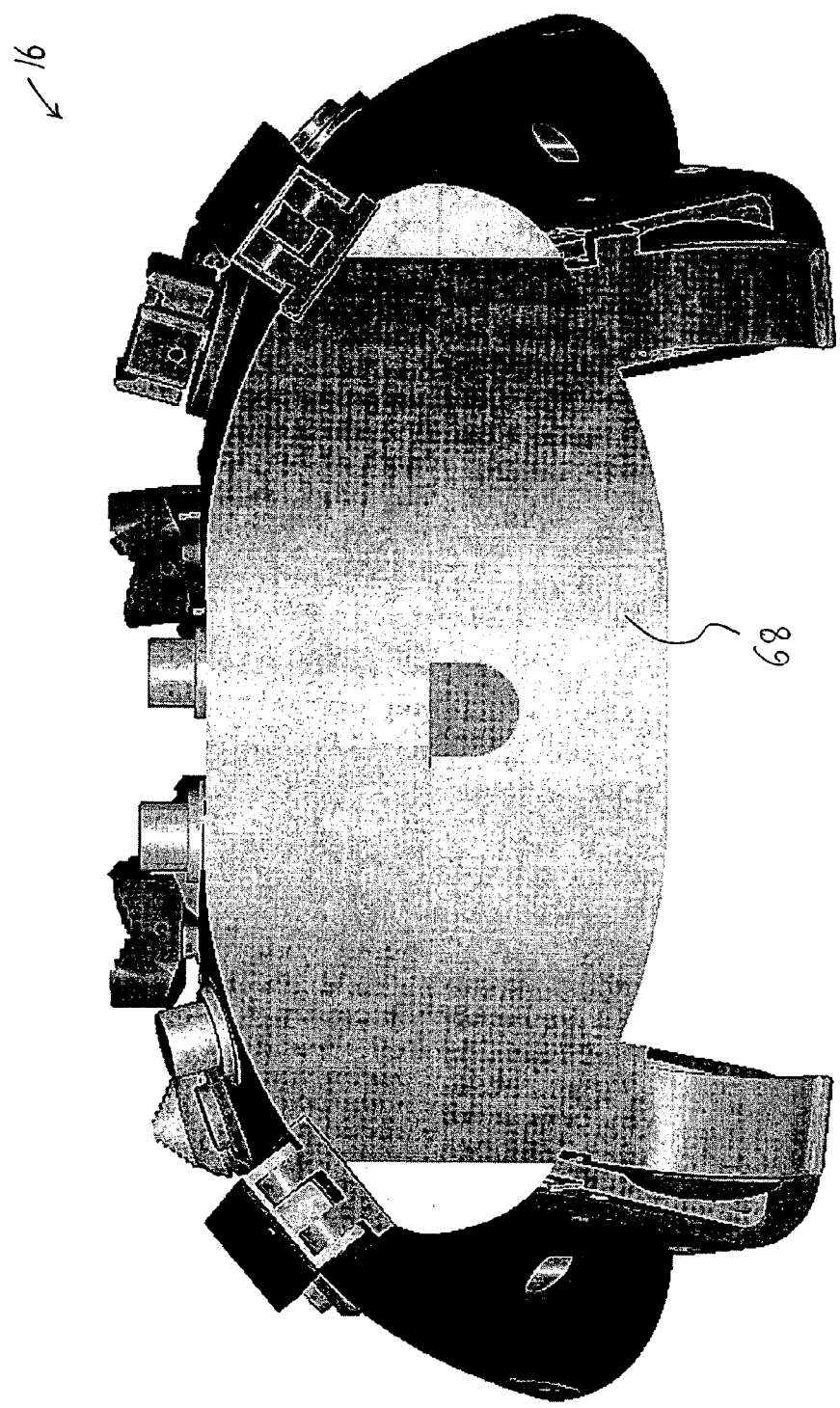
FIG. 9 is a front elevation view of the handheld controller.
Figure 10:
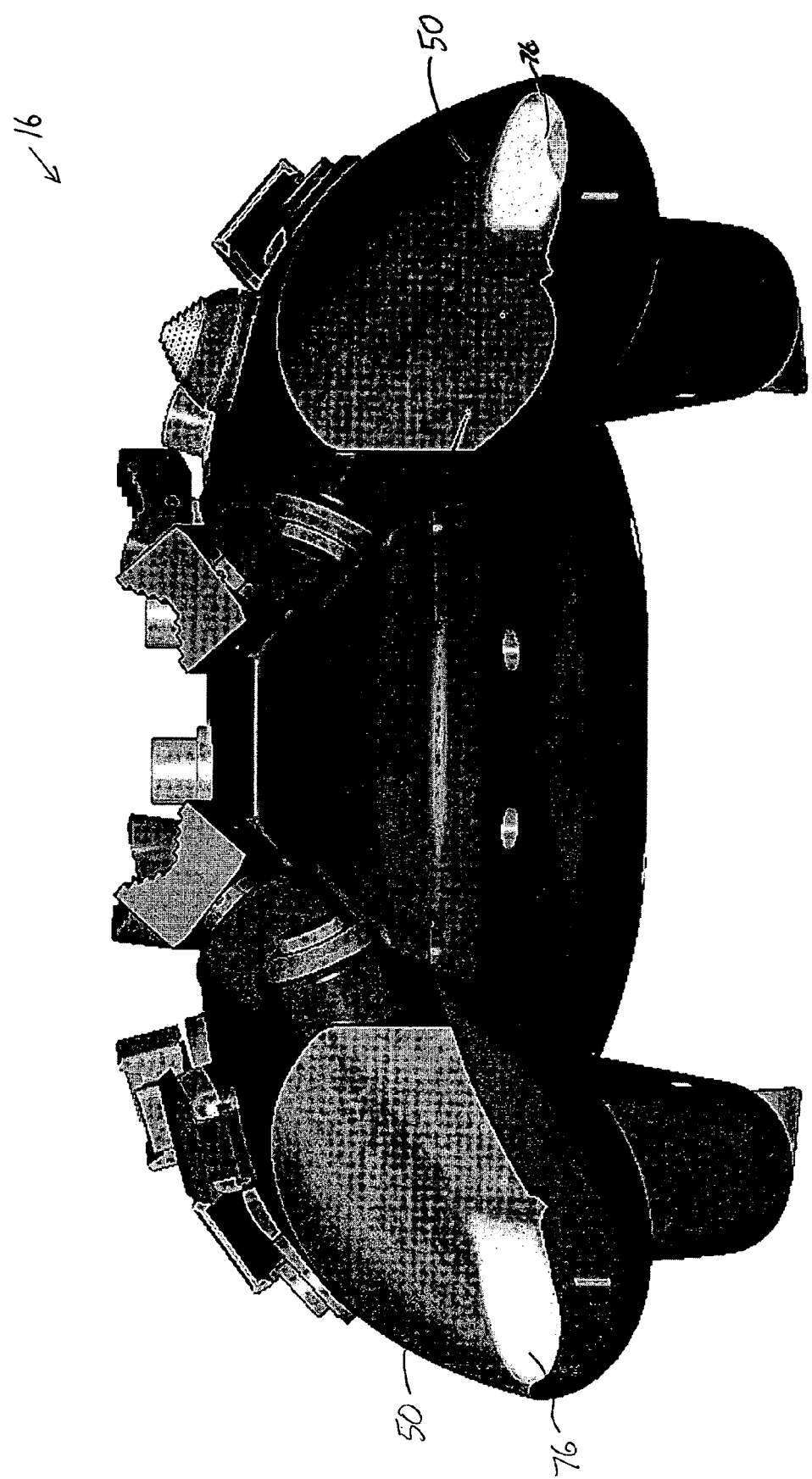
FIG. 10 is a rear elevation view of the handheld controller.

FIGS. 3-10 depict various views of the handheld controller, where FIG. 3 is a front perspective view of the handheld controller 16; FIG. 4 is a rear perspective view of the handheld controller 16; FIG. 5 is a top plan view of the handheld controller 16; FIG. 6 is a bottom plan view of the handheld controller 16; FIG. 7 is a right side elevation view of the handheld controller 16; FIG. 8 is a left side elevation view of the handheld controller 16; FIG. 9 is a front elevation view of the handheld controller 16; and FIG. 10 is a rear elevation view of the handheld controller 16.

Referring to FIG. 5, the handheld controller 16 utilizes a two handed contoured grip shape. The operator 10 grasps the controller such that the palms of the operator's hands 18 contact protruding handle portions 50, with the operator's thumbs 52 placed above an upper surface 54 of the controller. The operator's middle fingers 56, ring fingers 58, and pinkie fingers 60 grasp a lower surface 62 (FIG. 6) of the controller 16 at the protruding handle portions 50, while the fore (index) fingers 64 are placed proximate a trigger assembly 66 (FIG. 6) protruding from the bottom surface 62 of the controller 16 proximate a front end 68 of the controller 16.

As depicted in FIGS. 3-10, the handle portions 50 are contoured to fit the operator's hands 18. As best seen in FIG. 10, the handle portions 50 feature a rounded, almost elliptical, cross-sectional area As best seen in FIGS. 5 and 6, the handle portions 50 are tapered towards the rear of the controller 16. The shape and curvature of the handle portions 50 increase the area of the operator's grip so that the handle portions 50 fit more firmly in the operator's palm and, therefore, give better control of the handheld controller 16, with less chance of the operator 10 dropping the controller 16.

The controller 16 preferably utilizes a soft, polymer covering in the areas where the hands 18 will hold it. This covering allows for a better ergonomic, more comfortable fit to the hands 18 and the operator 10 is, therefore, less fatigued during its operation time. This covering may be designed to meet military standards such as fungus resistance. This covering also allows for thermal and electrical insulation.

The two handle portions 50 extend forward to join a contour shaped box 70, which features curved side surfaces 72. The box 70 is designed to be large enough to fit the required complement of devices 74 (e.g., buttons, switches, joysticks, levers, triggers, trackballs and the like) to control the aspects of the vehicle's operation. The top surface 54 of the handle portions 50 and box 70 are curved so that they increase in height from a rear 76 of the controller 16 to the front 68 of the controller 16. This configuration allows for the devices 74 to be placed in an ergonomic manner so that they are within easy access of the thumbs 52 and index fingers 64.

The box 70 may also be sized to house a printed circuit board (PCB) to interface with the various devices 74 and output the control signal to the signal processor 24 (FIG. 1). The PCB may be located in the top section of the controller 16 and is designed to be reconfigurable for different interface outputs. The controller 16 may house a microprocessor, input/output device, haptic device (e.g., force feedback), transmitter/receiver, cable terminal, memory (e.g., EPROM, EEPROM, flash memory, and the like), as is necessary for a particular application of the controller 16.

The controller 16 is preferably constructed using a light weight alloy metal. The use of light weight alloy metals such as, but not limited to, magnesium alloy AZ91 reduces the weight substantially to allow the operator to function quickly with the controller and not get fatigued. The use of a light weight alloy metal such as magnesium alloy AZ91 offers a 30-40% weight reduction over aluminum. Further, there is an advantage to the vehicle 14 (FIG. 1) by offering reduced fuel consumption by reducing the weight of the controller 16. Light weight metal alloys are preferred over plastic because the light weight metal alloys are more robust than plastic, will not damage as easily as plastic, and do not outgas when exposed to high temperatures, which is important in an enclosed cockpit area.

As best seen in FIG. 5, various devices 74 are placed on the top of the controller 16 for manipulation by the operator's thumbs 52. These devices may include buttons, switches, joysticks, levers, triggers, trackballs and the like, which are added to, and positioned on, the controller 16 as needed to meet the requirements for the particular application of the controller 16. For example, the controller 16 may include buttons 80 that are depressed by the thumbs 52 of the operator 10, two-way levers 82 that are moved in a side-to-side or front-to-back motion by the thumbs 52, four-way levers 84 that are moved in a side-to-side and front-to-back motion by the thumbs 52, or five-way levers 86 that are moved in a side-to-side and front-to-back motion and that may be depressed by the thumbs 52. It is contemplated that any type of device 74 that may be conveniently manipulated by the thumbs 52 of the operator 10 may be positioned on the top of the controller 16.

The location of the devices 74 may be selected based on the frequency of use of the device 74 or the speed at which the device 74 may be accessed. In addition, various critical devices 74 (e.g., such as those devices controlling power to the handheld controller 16 or controlling the arming of weaponry) may be shielded to prevent inadvertent manipulation. In the embodiment shown, covers 88 are used to shield critical devices 74. These covers 88 are hinged so that they may be flipped up by the operator 10 to access the critical devices 74.

Referring to FIG. 6, the bottom of the controller 16 includes two trigger assemblies 66 that are controlled by the operator's fore fingers 64. Each trigger assembly 66 includes a hinged shield 90 overlying a trigger 92. The fore fingers 64 of the operator 10 may rest upon the shields 90 to prevent inadvertent activation of the trigger 92, and when activation of the trigger 92 is desired, the operator 10 may lift the shields 90.

It is contemplated that each device 74 on the top and bottom of the controller 16 may be configured such that manipulating that device 74 controls a unique aspect of the vehicle's operation. For example, depressing a particular button 80 may activate an electronic fire control (weaponry) system, activating a particular lever 82 may adjust the weapon, and depressing a trigger 92 may fire the weapon. It is also contemplated that the manipulation of a combination of devices 74 controls a single aspect of the vehicle's operation. For example, firing a weapon may require that both triggers 92 be depressed.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A handheld controller for use by a human operator in controlling a plurality of aspects of a vehicle's operation, the handheld controller comprising:
   a box portion;
   handle portions extending from the box portion;
   a first plurality of devices disposed on a top surface of the box portion, each of the devices in the first plurality of devices being configured to control at least one aspect of the vehicle's operation; and
   a second plurality of devices disposed on a bottom surface of the box portion, each of the devices in the second plurality of devices being configured to control at least another aspect of the vehicle's operation, at least one of the second plurality of devices each being provided with a shield corresponding uniquely to that device, the shield configured to prevent inadvertent activation of the device;
   wherein
      while the human operator grasps the handle portions, the first plurality of devices are manipulated by the human operator's thumbs, the second plurality of devices are manipulated by the human operator's fore fingers, the location of the shield corresponds to a rest position of the operator's fore finger, and
      the handheld controller provides a control signal to the vehicle in response to manipulation of any of the first and second plurality of devices.

2. The handheld controller of claim 1, wherein the control signal is provided via a cable attached to the vehicle.

3. The hand held controller of claim 1, wherein the control signal is a wireless signal.

4. The handheld controller of claim 1, wherein the human operator and the controller are remote from the vehicle.

5. The handheld controller of claim 1, wherein the human operator and the controller are located within the vehicle.

6. The handheld controller of claim 1, wherein the box portion and the handle portions are formed from a metal alloy.

7. The handheld controller of claim 6, wherein the metal alloy is magnesium alloy AZ91.

8. The handheld controller of claim 6, wherein the handle portions are coated with a polymer material.

9. The handheld controller of claim 1, wherein the handle portions are tapered and have a generally elliptical cross section.

10. The handheld controller of claim 1, wherein the first and second plurality of devices each include one or more of: buttons, switches, joysticks, levers, triggers, and trackballs.

11. The handheld controller of claim 10, wherein at least one of the devices in the first and second plurality of devices is a haptic device.

12. The handheld controller of claim 1, wherein the aspects of the vehicle's operation controlled by the handheld controller include movement of the vehicle and at least one of: operation of the vehicle's weaponry, operation of the vehicle's defensive countermeasures, operation of the vehicle's communications devices, operation of the vehicle's sensors, and operation of the vehicle's surveillance devices.

13. A handheld controller for use by a human operator in controlling a plurality of aspects of a vehicle's operation, the handheld controller comprising:
   a box portion;
   handle portions extending from the box portion;
   a first plurality of devices disposed on a top surface of the box portion; and
   a second plurality of devices disposed on a bottom surface of the box portion, at least one of the second plurality of devices each being provided with a shield corresponding uniquely to that device, the shield configured to prevent inadvertent activation of the device;
   wherein
      while the human operator grasps the handle portions, the first plurality of devices are manipulated by the human operator's thumbs, the second plurality of devices are manipulated by the human operator's fore fingers, the location of the shield corresponds to a rest position of the operator's fore finger, and the handheld controller provides a control signal in response to manipulation of the first and second plurality of devices to control movement of the vehicle and at least one of: operation of the vehicle's weaponry, operation of the vehicle's defensive countermeasures, operation of the vehicle's communications devices, operation of the vehicle's sensors, and operation of the vehicle's surveillance devices.

14. The handheld controller of claim 13, wherein the control signal is provided via a cable attached to the vehicle.

15. The handheld controller of claim 13, wherein the control signal is a wireless signal.

16. The handheld controller of claim 13, wherein the human operator and the controller are remote from the vehicle.

17. The handheld controller of claim 13, wherein the human operator and the controller are located within the vehicle.

18. The handheld controller of claim 13, wherein the box portion and the handle portions are formed from a metal alloy.

19. The handheld controller of claim 18, wherein the handle portions are coated with a polymer material.

20. The handheld controller of claim 13, wherein the first and second plurality of devices each include one or more of: buttons, switches, joysticks, levers, triggers, and trackballs.

21. The handheld controller of claim 20, wherein at least one of the devices in the first and second plurality of devices is a haptic device.

22. The handheld controller of claim 13, wherein the at least one of the first and second plurality of devices includes one or more of: buttons, switches, joysticks, levers, triggers, and trackballs.

23. In combination;
A vehicle including at least one of: weaponry, defensive countermeasures, communications devices, sensors and surveillance devices and a signal processor capable of receiving control signals for adjusting various aspects of the vehicle's operation including operation of said weaponry, defensive countermeasures, communications devices, sensors and surveillance devices, and
a handheld controller for use by a human operator in controlling said vehicle's operation, the handheld controller comprising:
a box portion;
handle portions extending from the box portion;
a first plurality of devices disposed on a top surface of the box portion, each of the devices in the first plurality of devices being configured to control at least one aspect of the vehicle's operation; and
a second plurality of devices disposed on a bottom surface of the box portion, each of the devices in the second plurality of devices being configured to control at least another aspect of the vehicle's operation, at least one of the second plurality of devices each being provided with a shield corresponding uniquely to that device, the shield configured to prevent inadvertent activation of the device;
wherein
while the human operator grasps the handle portions, the first plurality of devices are manipulated by the human operator's thumbs, the second plurality of devices are manipulated by the human operator's fore fingers, the location of the shield corresponds to a rest position of the operator's fore finger, and the handheld controller provides said control signal to the vehicle in response to manipulation of any of the first and second plurality of devices.

24. The combination of claim 23, wherein the first and second plurality of devices include one or more of: buttons, switches, joysticks, levers, triggers, and trackballs.

25. The combination of claim 24, wherein at least the second plurality of devices includes at least one trigger shielded by a hinged cover that may be flipped up by the operator to access the device.

26. The combination of claim 25, wherein the first and second plurality of devices includes at least one trigger shielded by a hinged cover that may be flipped up by the operator to access the device.

27. In combination;
a vehicle including at least one of: weaponry, defensive countermeasures, communications devices, sensors and surveillance devices and a signal processor capable of receiving control signals for adjusting various aspects of the vehicle's operation including operation of said weaponry, defensive countermeasures, communications devices, sensors and surveillance devices, and
a handheld controller for use by a human operator in controlling said vehicle's operation, the handheld controller comprising:
a box portion;
handle portions extending from the box portion;
a plurality of devices disposed on a top surface of the box portion including one or more of: buttons, switches, joysticks, levers, triggers, and trackballs and
at least one trigger disposed on a bottom surface of the box portion and provided with a shield corresponding uniquely to that trigger to prevent inadvertent activation of the trigger;
wherein
while the human operator grasps the handle portions, the plurality of devices are manipulated by the human operator's thumbs, the trigger is manipulated by the human operator's fore fingers, the location of the shield corresponds to a rest position of the operator's fore finger, and
the handheld controller provides at least one control signal in response to manipulation of at least one of the plurality of devices to control movement of the vehicle and at least one of: the vehicle's operation of defensive countermeasures, operation of the vehicle's communications devices, operation of the vehicle's sensors, operation of the vehicle's surveillance devices and firing of the vehicle's weaponry.

28. The combination of claim 27, wherein the at least one trigger is shielded by a hinged cover that may be flipped up by the operator to access the device.

29. The combination of claim 27, wherein two triggers are disposed on the bottom surface of the box portion, said triggers are configured to control the same operation, and said triggers are configured to provide a control signal for said operation only in accordance with both triggers being simultaneously activated.

30. A handheld controller for use by a human operator in controlling a plurality of aspects of a vehicle's operation, the handheld controller comprising:
a box portion;
handle portions extending from the box portion;
a first plurality of devices disposed on a top surface of the box portion, each of the devices in the first plurality of devices being configured to control at least one aspect of the vehicle's operation; and a second plurality of devices disposed on a bottom surface of the box portion, each of the devices in the second plurality of devices being configured to control at least another aspect of the vehicle's operation, at least one of the second plurality of devices each being provided with a shield corresponding uniquely to that device, the shield configured to prevent inadvertent activation of the device;

wherein while the human operator grasps the handle portions, the first plurality of devices are manipulated by the human operator's thumbs, the second plurality of devices are manipulated by the human operator's fore fingers, the location of the shield corresponds to a rest position of the operator's fore finger, the handheld controller provides a control signal to the vehicle in response to manipulation of any of the first and second plurality of devices, a device provided with a shield is a control device for firing a weapon disposed on the vehicle, and the shield is effective to prevent inadvertent firing of the weapon.

* * * * *

UNITED STATES PATENT AND TRADEMARK OFFICE
CERTIFICATE OF CORRECTION

PATENT NO. : 7,471,216 B2  Page 1 of 1
APPLICATION NO. : 11/274621
DATED : December 30, 2008
INVENTOR(S) : Michael Chen et al.

It is certified that error appears in the above-identified patent and that said Letters Patent is hereby corrected as shown below:

On the title page, at (73) Assignee, "Ultra Electronics Measurement Systems, Inc., Fairfield, CT (US)"

should read --Measurement Systems, Inc., Fairfield, CT (US)--.

Signed and Sealed this

Twenty-third Day of November, 2010

David J. Kappos
*Director of the United States Patent and Trademark Office*